(No Model.)　　　R. T. & J. G. GLOVER.　　5 Sheets—Sheet 1.
COIN FREED APPARATUS.
No. 535,330.　　　　　　Patented Mar. 5, 1895.
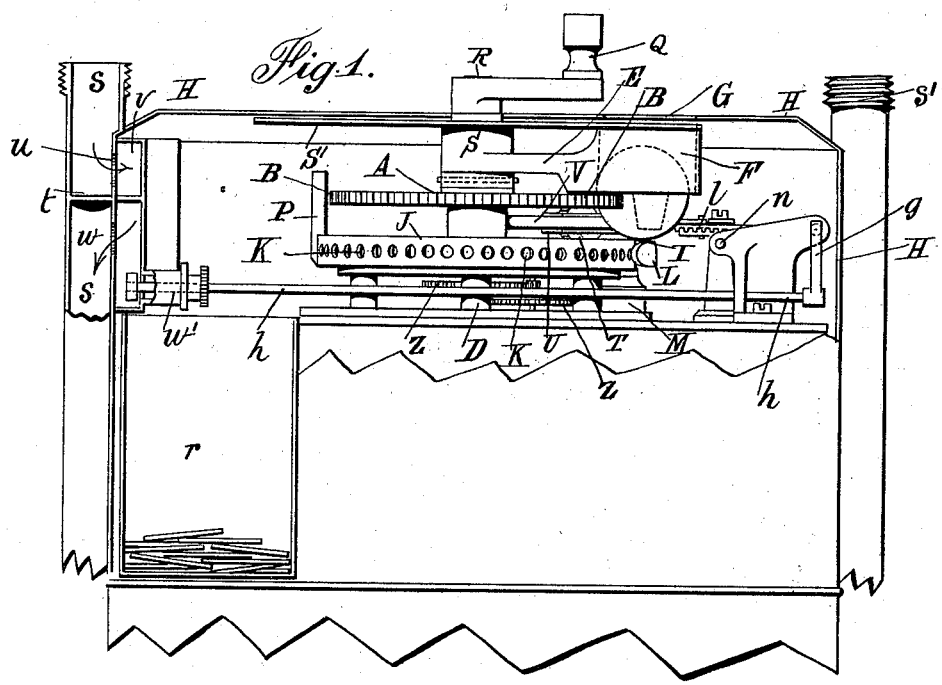
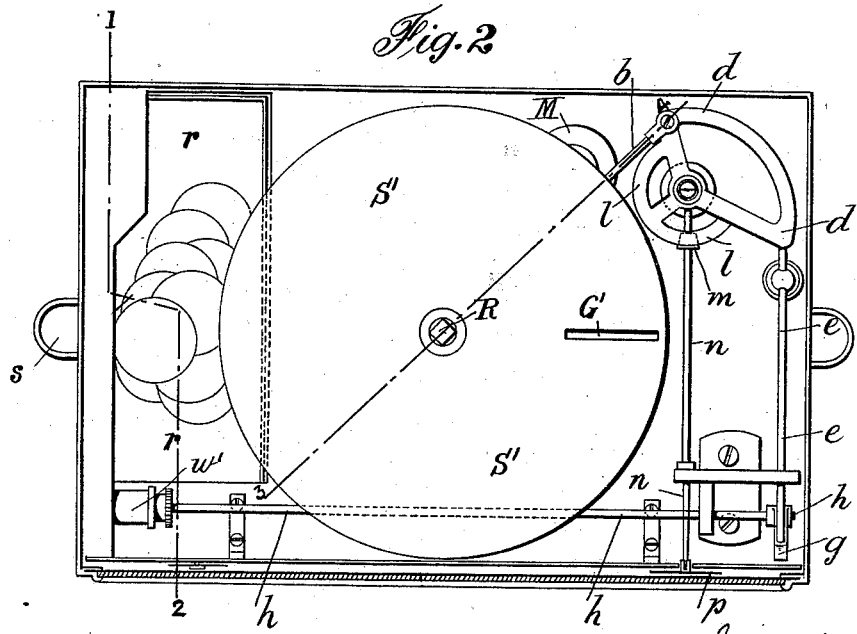

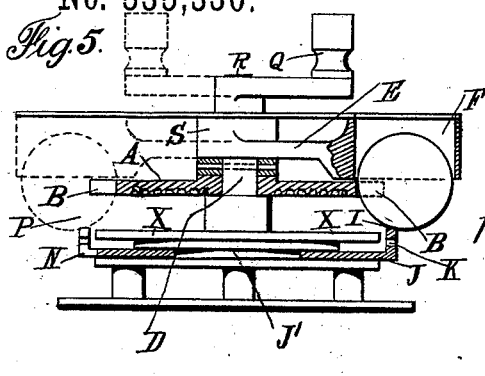
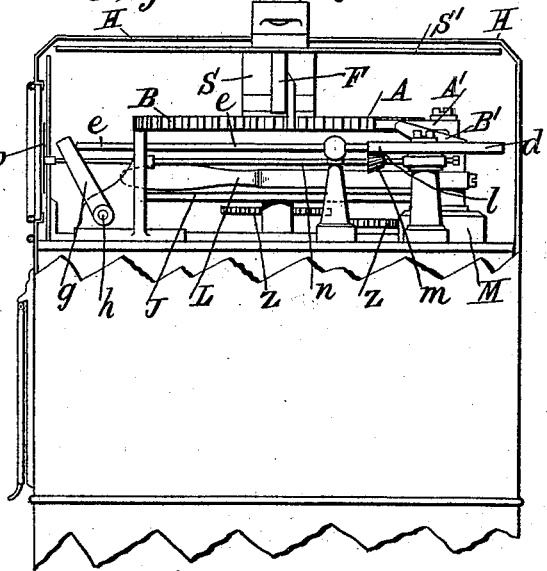
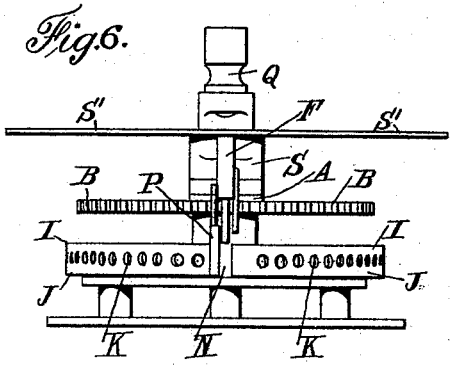
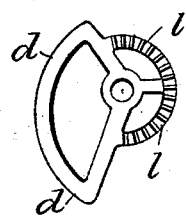
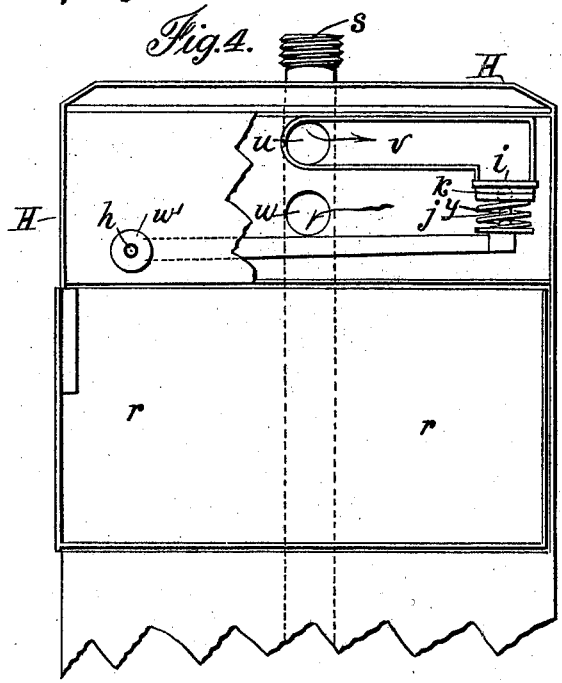

(No Model.)  
R. T. & J. G. GLOVER.  
COIN FREED APPARATUS.  
No. 535,330.  
5 Sheets—Sheet 3.  
Patented Mar. 5, 1895.
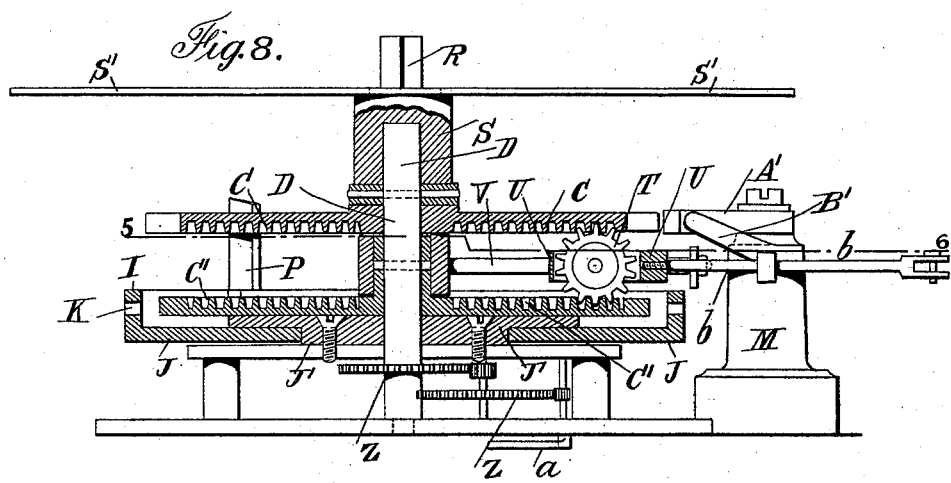
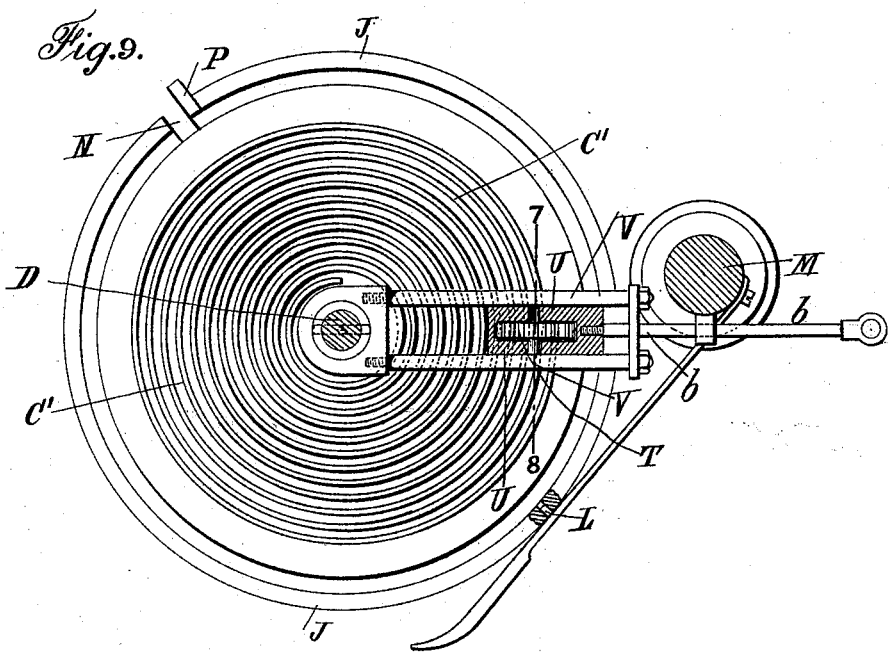
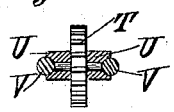
Witnesses:
G. W. Rea.
Thos. A. Green.
Inventors;
Richard T. Glover and
John G. Glover
By James L. Norris.
Atty.

(No Model.) 5 Sheets—Sheet 4.

R. T. & J. G. GLOVER.
COIN FREED APPARATUS.

No. 535,330. Patented Mar. 5, 1895.

Witnesses:
G. W. Rea.
Thos. A. Green.

Inventors:
Richard T. Glover and
John G. Glover,
By James L. Norris.
Atty.

(No Model.) 5 Sheets—Sheet 5.
R. T. & J. G. GLOVER.
COIN FREED APPARATUS.

No. 535,330. Patented Mar. 5, 1895.

Witnesses:
G. W. Rea.
Thos. A. Green.

Inventors:
Richard T. Glover and
John G. Glover,
By James L. Norris.
Atty

UNITED STATES PATENT OFFICE.

RICHARD THOMAS GLOVER AND JOHN GEORGE GLOVER, OF LONDON, ENGLAND.

COIN-FREED APPARATUS.

SPECIFICATION forming part of Letters Patent No. 535,330, dated March 5, 1895.

Application filed September 4, 1894. Serial No. 522,034. (No model.) Patented in England April 26, 1894, No. 8,327.

*To all whom it may concern:*

Be it known that we, RICHARD THOMAS GLOVER and JOHN GEORGE GLOVER, subjects of the Queen of Great Britain, residing at 214 St. John's Street, Clerkenwell, London, England, have invented certain new and useful Improvements Connected with Coin-Freed Apparatus for the Sale of Gas in Fixed Quantities, (patented in Great Britain, No. 8,327, dated April 26, 1894,) of which the following is a specification.

This invention has for its object, the construction of an apparatus of relatively small size for use in connection with gas meters upon or to which it is fixed in such a manner that a consumer wishing to obtain a supply of gas must prepay the same by the insertion of a coin of given size and value, which acting as a key, enables the consumer by turning a handle to open a valve for the passage of a proportionate quantity of gas to the service pipes.

Our invention will be thoroughly understood upon reference to the accompanying sheets of drawings, in which—

Figure 11:
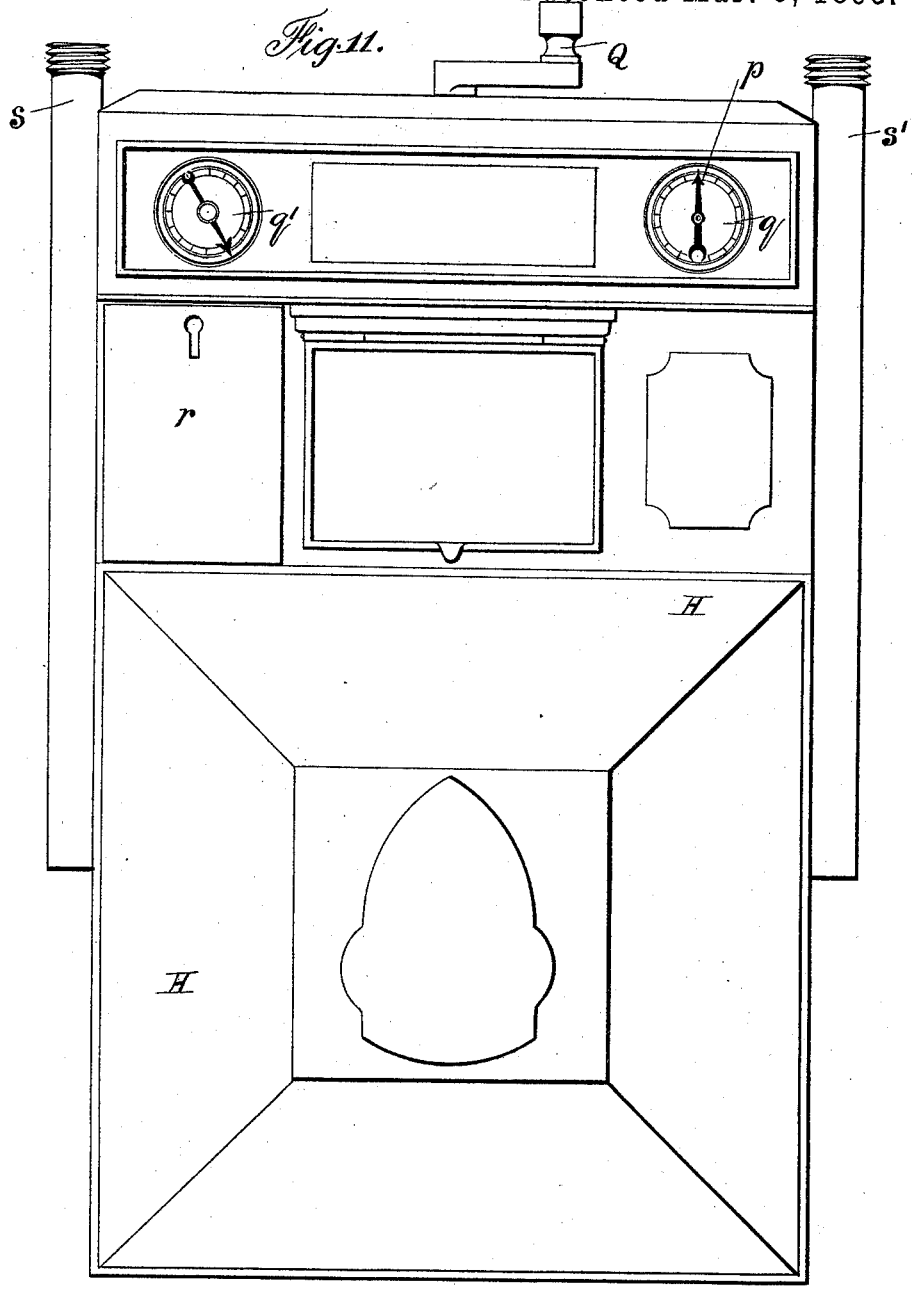
Figure 12:
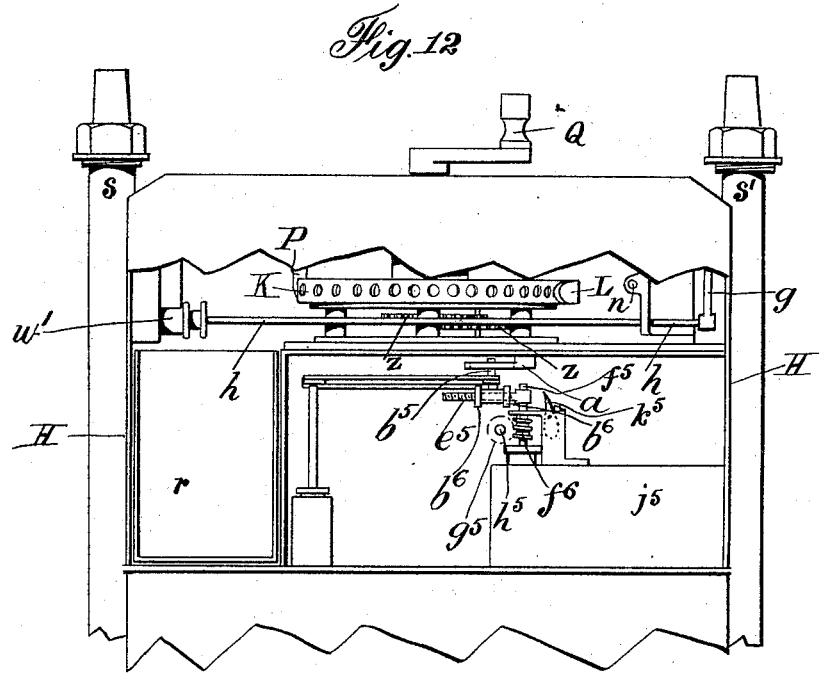
Figure 13:
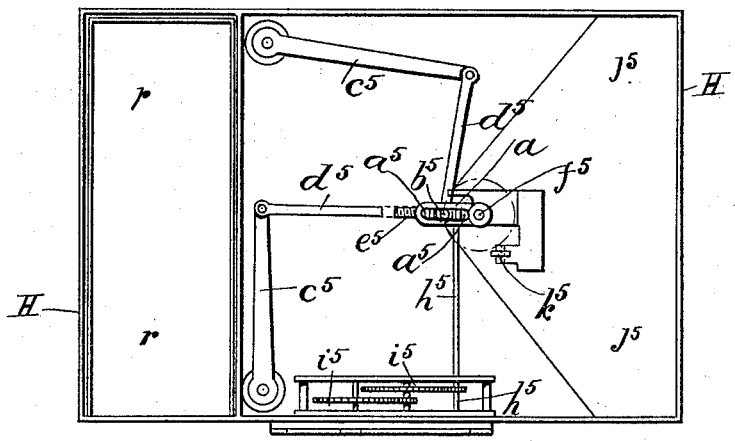

Figure 1 is a front elevation of the apparatus as applied to the top of a meter, the inlet pipe and inclosing case of which is in section. Fig. 2 is a plan of the same with the handle and top of the meter case removed. Fig. 3 is a side elevation of the apparatus, the meter case being represented as broken away. Fig. 4 is a part sectional elevation on line 1—2 of Fig. 2 looking to the left to clearly show the action and position of the gas inlet valve. Fig. 5 is a part sectional elevation more clearly showing the position of the coin when inserted. Fig. 6 is an elevational view of Fig. 5 taken at right angles showing the coin in a position to fall through the escape slot when the handle has been turned to the position represented by the dotted lines in Fig. 5. Fig. 7 is an under plan of the bell crank lever and crown wheel shown in top plan in Fig. 2. Fig. 8 is a sectional elevation of the apparatus on the line 3—4 of Fig. 2 but upon an enlarged scale. Fig. 9 is a sectional plan taken upon the line 5—6 of Fig. 8. Fig. 10 is a cross section on line 7—8, Fig. 9. Fig. 11 is an external front elevation of a complete prepayment gas meter. Fig. 12 is a front elevation illustrating the registering mechanism, and Fig. 13 is a top plan view thereof.

The invention primarily consists in forming a circular plate A with a number of notches B upon its periphery, and cutting, or otherwise forming a spiral groove C upon its under side from the center to the edge of same, or any intermediate distance, as may be desired.

Above the beforementioned circular plate A, and loosely mounted upon a central spindle D is an arm E and coin pocket F so arranged that upon the insertion of a coin of given size through the slot G of the meter case H it falls through the slot G' of the shield S' into the coin pocket F, and one of the notches B of the circular plate A and onto the upturned edge I of what is herein termed a divided table J which is marked off into a given number of divisions, in this case fifty, and has a corresponding number of holes K for the reception of a spring pin L that is fixed at one end to the pillar M. A slot N is cut in the upturned edge I of the divided table J, and immediately contiguous to it is a stop P, against which the coin pocket F strikes when turned, as shown more particularly in Figs. 5 and 6.

Each division or hole K in the table J is equivalent to a cubic foot of gas, so that the amount of gas to be delivered for a given coin can be easily determined, or varied to suit the varying prices of gas in different districts by withdrawing the spring pin L and turning the table J round to move the escape slot N and stop P a greater or less number of divisions away from said pin L, thereby regulating or determining the amount of turning movement of the plate A.

If the holes K in the table J are numbered consecutively from the escape slot N round to the stop P, the number of cubic feet of gas to be passed for a given coin will correspond to the number of the hole in which the spring pin is inserted.

The table J is so placed as to cause the penny to rest upon its edge I and to be partly in the coin pocket F and partly in one of the notches B of the circular plate A, thus acting as a key to lock said coin pocket F and plate A and cause them to move together when the handle Q fixed to the square end R of the coin pocket boss S is turned.

A wheel T pivoted to a sliding carriage U suitably held between guide bars V, V, as shown in Fig. 10 gears into the spiral thread or groove C cut or formed on the under side of the circular plate A, and also into a similar spiral groove or thread C' which is cut or formed upon the top of a plate X arranged below the said wheel T. The plate A is free to revolve upon the central spindle D but the bottom plate X is fixed thereto and revolves with it when operated by the meter mechanism, its relative rate of rotation being governed by means of a train of wheels Z, Z, interposed between said meter mechanism and spirally grooved or threaded bottom plate X, the connection between the meter registering mechanism and this train of wheels being effected by means of the bar $a$.

A rod $b$ is attached to the wheel carriage U at one end, the other end being connected to a bell crank $d$ which when moved causes the sliding rod $e$ to move to and fro to effect by means of the lever $g$ and rod $h$ the opening or closing, as the case may be, of the gas valve $i$ which is loosely articulated to its stem $j$ by a ball and socket, or universal joint $k$. The bell crank $d$ is formed with part of a crown wheel $l$ that gearing into a pinion $m$ fixed to the small spindle $n$ rotates same to cause the pointer $p$, Figs. 2, 3, and 11, to move over the indices of the dial $q$ to indicate to the consumer the amount of gas prepaid or remaining unconsumed.

The slotted bar $a$ previously referred to engages the pin $b^5$, Fig. 12, of the usual registering mechanism of a dry gas meter which pin engages the slot $a^5$ of the bar $a$ previously referred to and rotates it under the action of the usual tangential levers $c^5$ and connecting links $d^5$ which are operated by the meter bellows in the well known manner.

The slot $a^5$ in the bar $a$ is for the purpose of allowing any adjustment of the pin $b^5$ by moving the set nuts $b^6$, $b^6$, along the crank $e^5$ to suit the expansion of the meter bellows.

The spindle $f^5$ to the end of which the crank $e^5$ is fixed has a worm $f^6$ for engaging the wheel $g^5$ shown in dotted lines and turning the spindle $h^5$ and thus operating the usual train of registers $i^5$. The lower end of the spindle $f^5$ is in connection by the usual method to the ordinary sliding valves contained within the box $j^5$ and $k^5$ is the usual pawl for preventing the cranks $e^5$ from turning backward. One of the connecting links $d^5$ is shown broken away to more clearly show the crank $e^5$ below it.

A person wishing to obtain a supply of gas, inserts a coin, and by turning the handle Q before mentioned causes the spirally threaded notched plate A by the engagement of the coin in one of its notches to turn a given distance said distance being determined by the position of the coin pocket stop P and escape slot N through which the coin falls into the till $r$, said position varying according to whether more or less gas is to be supplied for a given coin, as before explained. This turning of the notched plate A causes its spiral thread to act as a worm to turn the wheel T which gears into and moves over the bottom spiral C' as upon a rack, and thus moves the carriage U to which the wheel T is pivoted inward upon the guide bars V, V, to operate the bell cranked and sliding rod $e$ and allow the valve to open for the supply of gas. The gas now enters by the inlet pipe $s$ which is partitioned at $t$ as shown more particularly at Fig. 1, and passes from thence through a hole $u$ in the meter side to the valve box $v$, Fig. 4, and through the valve orifice to another hole $w$ into the pipe $s$ but below the partition $t$, and then into the meter, the registering mechanism of which during the passage of the gas operates the slotted bar or tangent $a$ to rotate the train of wheels Z, Z, and the plate X. Said turning of the plate X causes its thread C' to act as a worm to turn the wheel T which then gears into and moves across the top spiral thread C as upon a rack, and thereby moves the carriage U back to its original or starting position. During such return movement the rod $b$ pushes the bell crank $d$ and causes it to turn upon its center and move the pointer $p$ over the dial $q$ by means of the wheel and pinion. It also moves the sliding rod $e$ which in turn pushes the lever $g$ outward to turn the rod $h$ that passes through the stuffing box $w'$ and is attached to the valve lever $k$ to move the gas valve $i$ up against its seating and cut off any further supply until the insertion of another coin. When the valve has closed upon its seating, the pointer $p$ is at zero.

Any number of coins may be inserted one after the other until the carriage U is moved to its inmost position and an equivalent value in cubic feet of gas will be returned to the consumer.

To prevent the plate A being turned in the wrong direction, a pawl A' and spring B' are provided to engage in the notches B.

By loosely articulating the valve $i$, no pressure is required to be put upon the valve $i$ to tightly close it such as is necessary in valves of ordinary construction.

A spring $y$ is used to stiffen the valve $i$, and keep same upon its work.

Having now described our invention, what we claim as new, and desire to secure by Letters Patent, is—

1. The combination of two spirally grooved plates with a valve governing pinion in gear, one of said plates being movable without affecting the other of the two plates over which the pinion can travel as on a rack bar together with coin controlled mechanism for operating the first plate, as set forth, and substantially as shown.

2. The combination with a coin controlled meter registering mechanism of two circular plates having spiral grooves on their inner faces, one of said plates being fixed on an axle or spindle and the other loose thereon, a pinion in gear with said plates and adapted to be revolved in one direction by the rotation of the fixed plate actuated from said meter registering mechanism, whereby the said pinion is caused to travel over the other plate as on a rack, a gas valve actuated from the said pinion, and an index and dial, substantially as shown and described.

3. The combination of a coin controlled meter registering mechanism, the two spirally grooved plates, a spindle to which one of the said plates is fixed and on which the other plate is loosely mounted, a pinion in gear with said plates and revolved by the fixed plate actuated from the said meter registering mechanism, a gas valve actuated from the said pinion, and the divided table provided with escape slot and stop, substantially as shown and described.

In witness whereof we have hereunto set our hands in presence of two witnesses.

RICHARD THOMAS GLOVER.
  JOHN GEORGE GLOVER.

Witnesses:
 JAMES WALTER MEUZIER,
  29 *Monnery Rd., Up Holloway, London.*
 WILLIAM GALILEE SAVILLE,
  10 *Bartholomew Villas, Kendish Town, London.*